United States Patent [19]

Metcalf

[11] Patent Number: 4,781,594

[45] Date of Patent: Nov. 1, 1988

[54] SOUND SIMULATION SYSTEM

[75] Inventor: Wilbur B. Metcalf, Renton, Wash.

[73] Assignee: The Boeing Company, Seattle, Wash.

[21] Appl. No.: 2,821

[22] Filed: Jan. 12, 1987

[51] Int. Cl.$^4$ .............................................. G09B 9/00
[52] U.S. Cl. ...................................................... 434/48
[58] Field of Search ........................................... 434/48

[56] References Cited

U.S. PATENT DOCUMENTS

| | | | |
|---|---|---|---|
| 3,718,987 | 3/1973 | Carver | 434/48 |
| 3,831,172 | 8/1974 | Olliges et al. | 434/48 |
| 3,845,572 | 11/1974 | McCanney | 434/48 |
| 4,023,078 | 5/1977 | Olliges et al. | 434/48 |

Primary Examiner—Leo P. Picard
Attorney, Agent, or Firm—James P. Hamley; B. A. Donahue

[57] ABSTRACT

A multiple channel composite sound generating system utilizes a microprocessor-based controller, single tone generators and random noise generators to control the frequency and attenuation of single tones and the attenuation of random noise bands for each channel. The controller interpolates host computer data to produce desired sounds. The system simulates the sounds of operating machinery, and adds realism to training environments such as aircraft training mockups.

14 Claims, 2 Drawing Sheets

SOUND SIMULATION SYSTEM

FIELD OF THE INVENTION

This invention relates to the electronic simulation of composite sounds to produce a realistic controlled multiple channel audio environment for the human listener. The invention is particularly suited for use in an aircraft simulation trainer.

DESCRIPTION OF THE PRIOR ART

For many years efforts have been made to devise electronic means for simulating sounds normally produced by other means. Devices such as electronic musical instruments, electronic doorbell chimes, and electronic sirens are indicative of the uses to which such technology has been applied. These devices have typically consisted of one or more sound generating devices, filter circuits, logic and timing circuits, amplifiers and speakers, and have operated in accordance with operator induced input such as the pressing of a doorbell button or keys on a piano-like keyboard. The increasing availability of reliable solid state electronic components has resulted in a sharp rise in the production of electronic sound simulators, and their use has become so prevalent that the average urban dweller now hears them many times daily. Typically, such devices produce a preset combination of sounds in response to a single operator action.

In the field of aircraft simulation trainers the prior art discloses a variety of systems in which individual, identifiable aircraft operating noises have been produced in response to specific operator actions. Such sounds include, for example, multiple propellers, hydraulic pumps, a large refueling-type aircraft taking off or landing with most of its fuel expended, a starter turbine, a main jet engine turbine, tire screech, afterburner noise, engine firing, engine whine, roar, air noise, and white noise (rumble or roar). The devices known in the art have the common limitation of being able to produce only those sounds and noises that they were specifically designed to produce. They tend to be inflexible, hardware specific, and customized to a particular aircraft model. These systems are difficult to modify and calibrate to prescribed specifications. Modification has usually required the addition of manually operated switches that are used to change sound characteristics. The amount by which an existing system can be so modified is limited by the number of manually operated switches necessary to produce desired sound characteristics. This limitation makes such sound system unsuitable for multiple purpose uses, and points out the need for a general electronic sound simulation system that can quickly and conveniently be reconfigured to produce almost any sound capable of electronic reproduction.

SUMMARY OF THE INVENTION

The present invention is a flexible software-driven multi channel system for producing composite sounds, consisting of a number of speakers, frequency programmable tone generators, programmable tone attenuators, programmable random noise attenuators, amplifiers, and at least one random noise generator. A controller having a microprocessor is used for processing and distributing digital data to establish frequencies to be generated by the tone generators and to establish attenuation levels for each of the programmable tone and random noise attenuators. All components are connected to form a system that produces multiple channel composite sounds. Data provided to the controller by a host computer, that is not claimed in the invention, permits any combination of tones and random noise bands to be provided at any level to any channel. All sound definitions and controls are configured in software for unlimited flexibility.

Frequency programmable tone generators generate single tones as system functions, each one available to all channels. Each tone is independently programmable in frequency, and is independently attenuated through programmable attenuators to each channel. All tones are available at independent levels to all channels. Random noise is generated and independently attenuated to each channel through programmable attenuators. Realism is enhanced when a separate generator is provided for each channel. Single tones and random noises for each channel are summed and supplied to an amplifier for that channel.

Changes in the frequencies of single tones, and in attenuation levels of single tones and random noises are caused by changes in digital data provided to programmable components by the controller through a common interface bus. The controller consists of a dedicated microprocessor (CPU) operating under instructions contained in its programmable read-only-memory (PROM). Data is provided to the controller by a host computer that oversees the entire training simulation environment.

The output of each random noise generator is passed through a number of parallel filters to create a variety of random noise bands from a low frequency rumble to a mid frequency roar to a high frequency hiss. The output from each filter is independently attenuable, thereby enabling the creation of any combination of random noise bands at differing volume levels. Each channel has full independent noise capability. Noise functions such as thumps, hisses or rumbles can be added (superimposed) on each other dynamically under program control. This provides a virtually unlimited range of random noise sounds to be created, mixed, and produced through any channel or combination of channels. Realism is enhanced by providing one random noise generator per channel, although this is not a requirement of the invention.

The controller comprises an interface between a host computer and the sound generating circuits. The host computer will normally be simultaneously controlling other peripheral devices, and is not considered to be part of the invention. The sound information values representing tones and attenuation levels for tones and random noise bands are calculated in the host computer as a part of the overall simulation and transmitted to the controller at each host computer update. Typical update rates are 70 milliseconds. The controller then distributes these values to the sound generating circuits which produce the sound.

The function of the controller is to process host data and distribute it to the sound generating circuits. It operates at a faster update rate than the host, and provides "smoothed" data to the sound circuits to eliminate noticeable steps in frequency or volume. It accomplishes this by calculating intermediate steps between the current value and the new value and updating the sound circuits several times between host update cycles. In this manner, data values supplied to programmable components reach the levels established during the most recent host update cycles. In this manner, data values supplied to programmable components reach the levels established during the most recent host computer update at approximately the same time that new data is received and the interpolation and update cycle of the CPU begins again. The update rate is dependent upon the number of sound circuits in the system, although sixteen milliseconds is typical. Besides performing the smoothing feature, the controller also supports a terminal to allow operator access to the sound data for maintenance and diagnostic purposes.

Data to be processed and transmitted to the sound components are transferred to the controller's random access memory buffers through direct memory access (DMA) by the host computer. If desired or necessary for a given application, larger or more complex systems can use a multiplicity of controllers and computers. When this is done, each controller may be considered as a separate system having its own set of sound generating components and attenuators, and may be daisy chained with other controllers under the control of the same host computer. The outputs of systems having multiple controllers or computers can be mixed to create common channels, or can be maintained in separate channels, each having its own speaker system. Selection of a given controller is carried out through multiplexing, as each controller may be directly addressed via its device address which is present in the control word generated by its host computer. Data transmitted from the host computer is used to establish the parameters for the operating components. Sound combinations are generated by the system in accordance with input from the host computer.

For certain applications, such as where background noise is very high or, conversely, where noise must be kept to a minimum, it may be desirable to replace the speakers with headphones. In this case the system would be configured to produce only two sound channels.

Although this invention has a theoretically unlimited number of potential uses, it is particularly well suited to simulate the sounds of operating machinery, such as an aircraft. When used with appropriate host computer software in a cockpit simulation training device the invention will produce realistic operating noises for any number of specific aircraft types through this multi channel system in accordance with pilot induced actions. Thus, for example, when the landing gear handle is lowered, the host computer would sense the movement and cause audio changes within the cockpit to simulate the lowering of the landing gear. In this case, the sound system might be programmed to produce the sounds of a hydraulic pump, of increased airflow around the landing gear doors, struts and tires, and a characteristic "thump" caused by mechanical downlock devices falling into place. Other typical sounds simulated by the invention include the sound of flaps being raised and lowered, aerodynamic noise caused by airflow around the aircraft, and engine noises associated with engine RPMs.

DETAILED DESCRIPTION OF THE DRAWINGS

Figure 1:
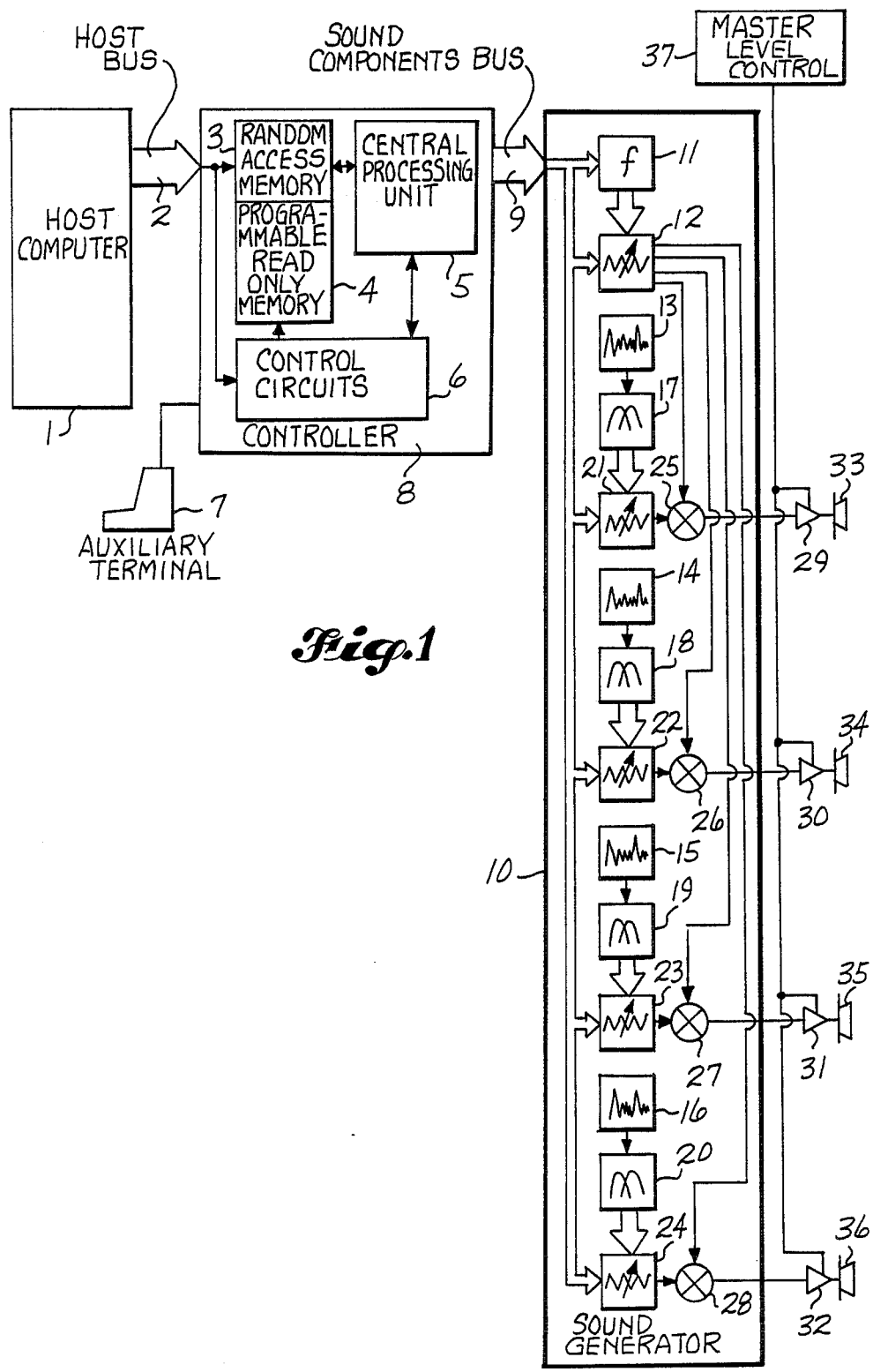
FIG. 1 is a schematic diagram illustrating the preferred embodiment of the electronic sound simulation system.

FIG. 1 provides a schematic diagram of the sound system from the parallel interface host bus 2 to the speakers 33-36. Host bus 2 is the interface between the host computer 1 and the controller 8. Typically, the host bus 2 will consist of at least 22 lines, of which sixteen are used for the transmission of data and addresses, and six are used for control signals.

Host computer 1 directly accesses the random access memory (RAM) 3 within the controller, transferring data into an input buffer in RAM at a very high rate of transfer.

A typical direct memory access (DMA) transfer is initiated by the host computer generating a control word on the host bus and a control signal indicating that a control word is available. The control word contains a device address, a direction indicator, and a starting address in RAM. A device address for the controller to which the transfer is directed is necessary, as several controllers or other peripheral devices may be multiplexed on the same host bus. The device address is decoded and, if the controller's CPU 5 is not immediately busy, disconnects itself from its RAM and control circuits 6 and connects the host bus directly to the RAM. Data is then transferred from the host computer into the RAM beginning at the starting address contained in the control word. Control circuits 6 include a counter that automatically increments the RAM address following each data word. The transfer is terminated by a computer disconnect control signal sent by the host computer. The CPU 5 then reconnects and resumes its task of calculating intermediate values and sending data to the sound components bus.

Although transfers between the host computer 1 and the controller 8 proceed only in the direction from the host to the controller, the control word must nevertheless contain a direction indicator, as the host may also be communicating with other peripherals (not shown) in which a two-way data transfer or a transfer from the peripheral to the host will take place.

Once the data is in RAM, the central processing unit (CPU) 5, operating under the software program contained in the programmable-read-only-memory (PROM) 4, reformats and transfers the data from its input buffer to a working buffer in RAH. As it does this, it interpolates the amounts by which each unit of data for each programmable component must be incremented or decremented during each controller update cycle to bring the input parameters for that component from their current settings to the settings dictated by the host computer during the last host update. The controller then begins sending interpolated data to the sound generator 10 via the sound components bus 9. As the sound system components are memory mapped in the controller's hardware, the CPU operates as if it were simply transferring updated data values into a different segment of memory.

The address and data formats provided to the programmable components by the controller will be determined by the design characteristics of the components. The output of a given component normally remains constant until it receives different input data that causes a change in that output.

The sound generator 10 shows the relationship of the single tone generators 11, random noise generators 13-16, random noise filters 17-20, and attenuators 12, 21-24 to one another. Data is transferred from the controller 8 to the sound components bus 9 in a formatted block of data having a predetermined sequence. Conventional address decoder/counter circuitry (not shown) selects the components to be programmed in a predetermined order and the programming data is written to each selected component in turn.

The frequencies of the single tone generators 11 are determined by the values of the sixteen bit data words sent to them. The output from each of the single tone generators 11 is connected in parallel to one attenuator for each channel in the system. In a system having four channels and twenty-five single tone generators, there will be a total of 100 single tone attenuators 12. Each attenuator attenuates the single tone in an amount that is a function of its programmed input data. Its output signal is summed with other attenuated single tone signals for the same channel.

Each channel has one random noise generator 13-16. The random noise for each channel is passed through a number of random noise filter circuits 17-20 connected in parallel, and from each filter to an independent attenuator. In a system having 8 random noise bands there will be eight random noise attenuators 21-24 for each channel. The outputs from the random noise attenuators for the same channel are summed and then mixed with the single tone signals for that channel at mixers 25-28. The mixed signal is amplified by amplifiers 29-32 and sent to the speakers 33-36 for that channel.

Overall gain control is available through a master level control 37 that increments or decrements the gain level of all power amplifiers simultaneously in increments of approximately 3 decibels. An auxiliary terminal 7 or keyboard may be used to introduce maintenance or diagnostic data through an auxiliary port directly to the controller.

Figure 2:
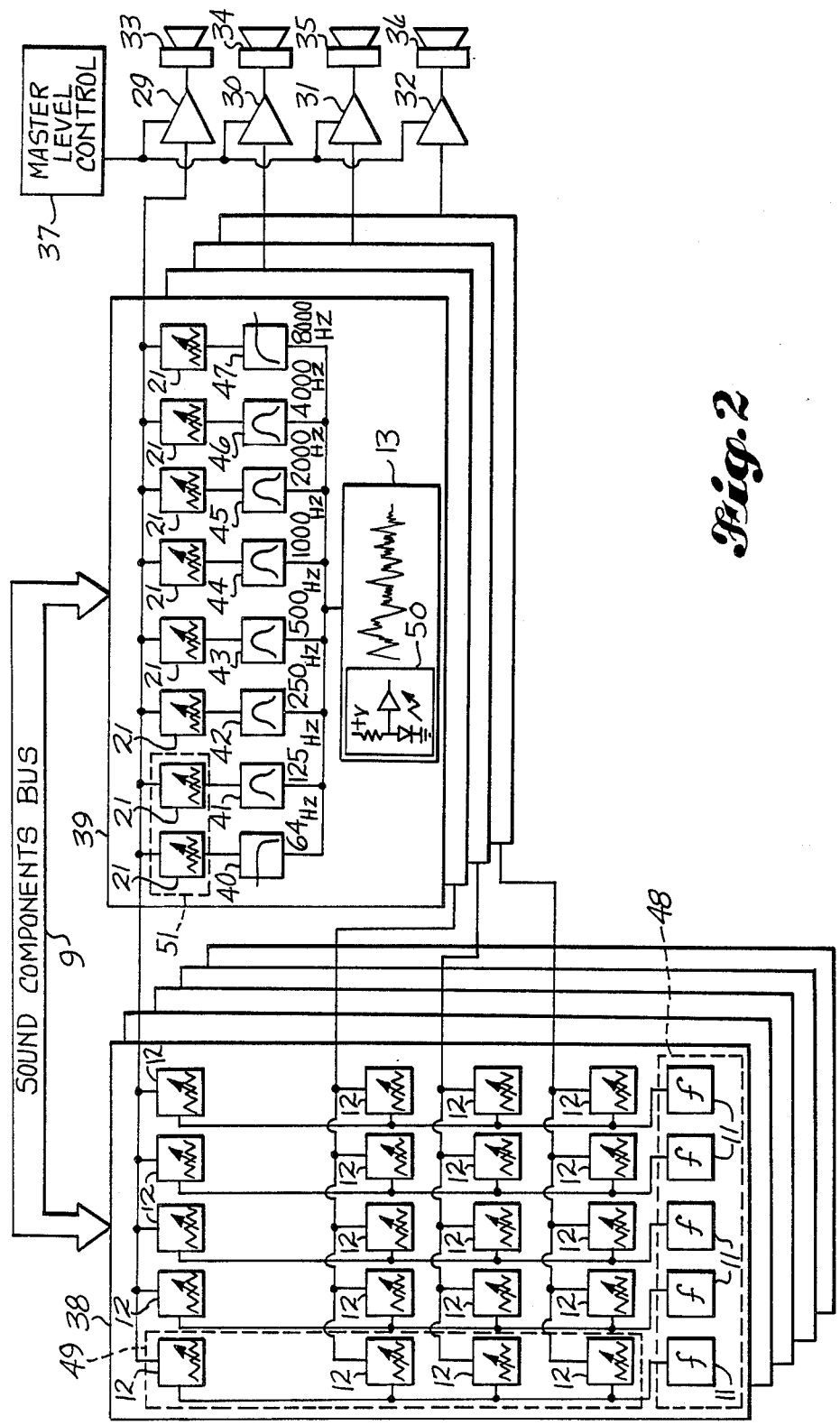
FIG. 2 is a schematic diagram illustrating a method of physically configuring the basic sound generating and attenuating components comprising the preferred embodiment on boards that can be exchanged, removed, or concatenated as necessary to test, repair, or reconfigure the system.

FIG. 2 shows representative schematic wiring for two modular "board" mountings. Board 38 contains five frequency programmable single tone generators 11 incorporated in a single chip 48 (such as the AM 9513) and twenty single tone attenuators 12 incorporated in five attenuator chips 49 (such as the AD 7226). The frequency generated by each tone generator is typically determined by a sixteen bit data word having a positive count value such that the frequency will equal a constant divided by the data word value. Data word count values from 30,000 to 150 Hz will normally produce tones within the audio range of 100 to 20,000 Hz. Volume levels of the attenuators are set with eight bit data words having a positive value between zero and two hundred fifty-five, representing volume levels from full off to full on. It can be seen that each attenuator chip 49, containing four independently programmable attenuators, will modify the signal level from one tone generator to each of four channels, and that the use of five attenuator chips 49 provides complete attenuation control for the output of one tone generator chip in a four channel system.

Board 39 contains a random noise generator 13, eight random noise filters 40-47, and eight random noise attenuators 21. Broad band random noise is generated by amplifying the electrical noise in an LED circuit 50. Eight filters 40-47 are used to produce eight random noise bands centered at the octave frequencies of 63, 125, 250, 500, 1000, 2000, 4000, and 8000 Hz Filters 40 and 47 are low pass and high pass filters, respectively, as they operate at the extreme opposite ends of the audible random noise spectrum. The other bands are produced by band pass filters, and can be as broad or narrow as desired, depending upon system design. The output from each filter is wired to an input of a programmable attenuator 21. Board 39 includes four attenuator chips 51 (such as AD 7528), each of which incorporates two independent attenuators. Attenuation levels are set by programming two internal registers with eight bit values. When 16 bit data words are used, the high and low bytes of the word may be used for separate attenuators. The output from each attenuator can be varied in increments from zero to two hundred fifty-five, representing volume levels from full off to full on. The outputs of attenuators 21 are wired through gain setting resistors (not shown) that are used to calibrate the output of each band, and are summed with the single tones for that channel. Each noise generator card can be programmed using four 16-bit words of memory address.

Although the preferred embodiment shows a four channel system using four speakers, eight random noise filters per channel, and twenty five single tones, it can be seen that any number of channels, random noise bands, and single tones may be used in the system, and that other electroacoustic sound devices, such as headphones, may be used in place of speakers.

Preferred Embodiment Configuration

In the preferred embodiment, the individually attenuated outputs from twenty-five frequency programmable single tone generators and four random noise generators, each producing eight random noise bands, are combined as indicated and directed to four channels, each channel having its own amplifier and speaker(s). It is recognized that the number of sound producing components (single tone and random noise generators and attenuators) is theoretically limited only by the controller's ability to process updated information multiple times between successive host computer cycles, and that different configurations could prove more suitable for other uses. The preferred embodiment described and depicted herein is representative of systems having either a greater or lesser number of components, and demonstrates an installation suitable for use in a simulated aircraft cockpit trainer.

Under normal operation the system receives input data setting the operating parameters for programmable sound producing components from a host computer that controls the overall simulation environment. This communication is carried out through a suitable host interface and connecting cables. An auxiliary terminal to the system is provided in the event that host data must be overridden, modified, or examined for diagnostic and maintenance purposes.

The basic sounds are single tones and random noise. Pure single tones are produced by commercially available frequency generators, and are configured to be programmable in frequency and volume level to each speaker in a multiple channel system. Fast cyclical updating of the frequency parameter of a single tone generator can be made to cause a rapid, yet smooth, rise or fall in the pitch of the tone developed, thus permitting the generation of sounds that range from constant tones (no change in pitch) to fast "whoops" (rapid changes in pitch). The random noise is a group of eight frequency bands, low to high, emanating from a random noise generator corresponding to each channel. A separate random noise generator is used for each channel in order to provide realism and to avoid the potential interference and distortion effects that could result if the same random noise signal were used for different channels. The volume level of each random noise band is programmable to its speaker. The noise bands are centered at the octave frequencies of 63, 125, 250, 500, 1000, 2000, 4000, and 8000 Hz. Typically, several tones are combined to simulate engine whine while various noise bands are used for engine exhaust, air flow, touchdown, and other significant sounds. The combination of variable tones and noise bands, under the control of host computer software, realistically simulates the cockpit sounds of an aircraft performing the maneuvers called for by the pilot of the simulator.

The controller is situated between the host computer and the sound generating circuits, and interfaces with them through suitable parallel interface busses. The function of the controller is to process data from the host computer and distribute it to the sound generating circuits. The host computer transfers data directly to random access memory (RAM) in the controller during each computer update cycle. The controller's central processing unit (CPU) operating in accordance with a predetermined program in the programmable read-only-memory (PROM), performs a smoothing function on the data between host computer updates to eliminate any noticeable stepping of frequency or volume levels. This is accomplished by passing calculated intermediate values to the attenuators and single tone generators at a fast internal update cycle. When necessary for testing or system diagnosis, data can also be entered from a terminal other than the host computer. The overall volume of the system can be varied from a remote location using a single control. When this is done, the four channel amplifiers are simultaneously adjusted up or down in 3 decibel increments.

As it is a common practice for microchip manufacturers to situate multiple components of the same type upon a single chip, the overall sound system design may reflect a modular "board" structure with compatible chips being situated on the same board and interfaced to the rest of the system through a common address/data bus. FIG. 2 illustrates the circuitry and interfacing of two such boards. Modular configurations of this kind permit the system to be expanded to increase the number of single tones, or channels, simply by adding on "plug in" boards and modifying host computer software. As readily available commercial components can be used in this invention, the addressing and data formats for sound generators and attenuators are necessarily dependent upon the design characteristics of the chip.

What is claimed is:

1. A system for producing composite sounds, comprising:
   a plurality of electroacoustic devices;
   a plurality of frequency programmable tone generators;
   a plurality of programmable tone attenuators;
   at least one random noise spectrum generator means for generating noise bands with predetermined center frequencies spaced to cover an audio spectrum;
   a controller means for processing and distributing digital data to establish frequencies to be produced by said frequency programmable tone generators and to establish levels of attenuation to be applied by said programmable tone attenuators and said programmable random noise attenuators;
   a connecting means to interconnect said plurality of electroacoustic devices, said plurality of frequency programmable tone generators, said plurality of programmable tone attenuators, said at least one random noise spectrum generator means, said plurality of programmable random noise attenuators, and said plurality of amplifiers to produce multiple channel composite sounds.

2. The invention according to claim 1 wherein said electroacoustic devices comprise headphones.

3. The invention according to claim 1 wherein said frequency programmable tone generators, said programmable tone attenuators, and said amplifiers are connected to permit the output of each frequency programmable tone generator to be simultaneously supplied to the inputs of each of said amplifiers at independent levels of attenuation.

4. The invention according to claim 3 wherein the output from each said frequency programmable tone generator is supplied in parallel to the input of each said amplifier, and a separate said programmable tone attenuator is connected in series between each said output of said frequency programmable tone generators and each said input of said amplifiers, whereby the frequency produced by each said frequency programmable tone generator can be distributed to each said amplifier at an independently programmable level of attenuation.

5. The invention according to claim 1 wherein said electroacoustic devices comprise speakers, 6. The invention according to claim 5 wherein each said amplifier is connected to a separate said electroacoustic device.

7. The invention according to claim 6 wherein there is one said random noise spectrum generator, said random noise generator means further comprising:
   a broad band random noise producing circuit;
   a plurality of filter circuits;
   a connecting means wherein a broad band of random noise produced by said broad band random noise producing circuit is supplied in parallel to said plurality of filter circuits, and the output from each filter circuit is independently attenuated through one of said programmable random noise attenuators and supplied to the inputs of said amplifiers at independent levels of attenuation;
   whereby any combination of random noise sounds produced by said filter circuits can be supplied to said amplifiers with each said random noise sound having an independently programmable level of attenuation.

8. The invention according to claim 6 wherein, for each said amplifier there is one corresponding said random noise spectrum generator means, each said random noise generator means further comprising:
   a broad band random noise producing circuit;
   a plurality of filter circuits;
   a connecting means wherein a broad band of random noise produced by said broad band random noise producing circuit is supplied in parallel to said plurality of filter circuits, and the output from each filter circuit is independently attenuated through one said programmable random noise attenuator, and is summed with the outputs of other said random noise attenuators and supplied to the input of said corresponding amplifier at independent levels of attenuation;

whereby any combination of random noise sounds produced by said filter circuits can be supplied to said corresponding amplifier with each said random noise sound having independently programmable levels of attenuation.

9. The invention according to claim 7 or 8 wherein said plurality of filter circuits further comprises:

a plurality of band pass filter circuits, each said band pass filter circuit being centered around said predetermined center frequency;

a high pass filter circuit;

a low pass filter circuit.

10. The invention according to claim 9 wherein the said center frequencies of said band pass filter circuits are separated from each other by intervals approximating multiples of an octave.

11. The invention according to claim 10 wherein said digital data to be processed and distributed by said controller means are supplied to said controller by a host computer.

12. The invention according to claim 10 wherein said digital data to be processed and distributed by said controller means are supplied to said controller by an auxiliary terminal.

13. The invention according to claim 10 wherein said digital data values that are processed by said controller means are smoothed between input updates by producing and distributing calculated intermediate values.

14. The invention according to claim 13 wherein the gain of said amplifiers can be controlled simultaneously with one master level control, whereby the overall volume of sound produced by the sound system can be raised or lowered with said master level control.

* * * * *